(12) United States Patent
Ross et al.

(10) Patent No.: US 10,502,139 B2
(45) Date of Patent: Dec. 10, 2019

(54) METHOD OF STARTING A GAS TURBINE ENGINE INCLUDING A COOLING PHASE

(71) Applicant: General Electric Company, Schenectady, NY (US)

(72) Inventors: Steven Alan Ross, Cincinnati, OH (US); Mark Edward Linz, Cincinnati, OH (US); Joseph Daniel Garrett, III, Parkersburg, WV (US); Amid Ansari, Mason, OH (US); Joseph Roger Broda, West Chester, OH (US); Thomas Earl Gillingham, Cincinnati, OH (US); Kevin Richard Graziano, Cincinnati, OH (US); Robert Charles Hon, Fort Mitchell, KY (US); Kenneth Kirchmayer, Cincinnati, OH (US); Daniel Roy Kiracofe, Cincinnati, OH (US); Andrew Todd Lehmann, Hamilton, OH (US); Michael Scott McCambridge, Cincinnati, OH (US); Tod Robert Steen, West Chester, OH (US); Thomas Charles Swager, Mainville, OH (US)

(73) Assignee: General Electric Company, Schenectady, NY (US)

(*) Notice: Subject to any disclaimer, the term of this patent is extended or adjusted under 35 U.S.C. 154(b) by 269 days.

(21) Appl. No.: 14/607,401

(22) Filed: Jan. 28, 2015

(65) Prior Publication Data

US 2016/0348588 A1    Dec. 1, 2016

(51) Int. Cl.
*F02C 7/26* (2006.01)
*F02C 7/12* (2006.01)
(Continued)

(52) U.S. Cl.
CPC .............. *F02C 7/26* (2013.01); *F01D 19/02* (2013.01); *F02C 3/04* (2013.01); *F02C 7/12* (2013.01);
(Continued)

(58) Field of Classification Search
CPC ........ F02C 3/04; F02C 7/26–277; F02C 7/12; F02C 9/00; F02C 9/28; F05D 2260/85;
(Continued)

(56) References Cited

U.S. PATENT DOCUMENTS 4,733,529 A    3/1988   Nelson et al.
4,854,120 A    8/1989   Nelson et al.
(Continued)

FOREIGN PATENT DOCUMENTS

EP    2305986 A2    4/2011
FR    2185753 A1 *  1/1974 ............. F01D 25/34
(Continued)

OTHER PUBLICATIONS

European Search Report and Written Opinion issued in connection with corresponding EP Application No. 16151244.7 dated Jun. 24, 2016.
(Continued)

*Primary Examiner* — Gerald L Sung
*Assistant Examiner* — Alain Chau
(74) *Attorney, Agent, or Firm* — Dority & Manning, P.A.

(57) ABSTRACT

A method of starting a gas turbine engine having a rotor comprising at least a shaft-mounted compressor and turbine, with a casing surrounding the rotor includes an acceleration phase, a bowed-rotor cooling phase, during the acceleration, and a combustion phase. The bowed-rotor cooling phase comprises a time where the rotational speed of the rotor is maintained below a bowed-rotor threshold speed until a non-bowed condition is satisfied, wherein the air forced
(Continued)

through the gas turbine engine cools the rotor. The combustion phase occurs after the bowed-rotor cooling phase and upon reaching the combustion speed, wherein fuel is supplied to the gas turbine engine.

15 Claims, 4 Drawing Sheets

(51) Int. Cl.
  *F01D 19/02*   (2006.01)
  *F02C 7/268*   (2006.01)
  *F02C 3/04*   (2006.01)
  *F02C 9/00*   (2006.01)

(52) U.S. Cl.
  CPC ............... *F02C 7/268* (2013.01); *F02C 9/00* (2013.01); *F05D 2260/85* (2013.01); *F05D 2270/042* (2013.01); *F05D 2270/304* (2013.01); *Y02T 50/671* (2013.01)

(58) Field of Classification Search
  CPC ........... F05D 2270/04; F05D 2270/042; F05D 2270/304; F05D 2260/96; F01D 19/00; F01D 19/02; F01D 21/04; F01D 21/08
  See application file for complete search history.

(56) References Cited

U.S. PATENT DOCUMENTS

| | | | |
|---|---|---|---|
| 6,684,898 B2 | 2/2004 | Wiggins et al. | |
| 8,776,530 B2 | 7/2014 | Shirooni et al. | |
| 9,567,906 B2 | 2/2017 | Nesdill et al. | |
| 2007/0234734 A1* | 10/2007 | Uluyol | F02C 7/26 60/778 |
| 2010/0085676 A1 | 4/2010 | Wilfert | |
| 2010/0287944 A1 | 11/2010 | Draper et al. | |
| 2010/0293961 A1* | 11/2010 | Tong | F01D 19/00 60/778 |
| 2011/0146291 A1* | 6/2011 | Snider | F01D 19/00 60/778 |
| 2014/0123673 A1 | 5/2014 | Mouze et al. | |
| 2014/0373518 A1 | 12/2014 | Manneville et al. | |
| 2014/0373552 A1 | 12/2014 | Zaccaria et al. | |
| 2014/0373553 A1 | 12/2014 | Zaccaria et al. | |
| 2015/0211421 A1* | 7/2015 | Harriet | F02C 7/275 60/778 |

FOREIGN PATENT DOCUMENTS

| | | |
|---|---|---|
| JP | 2013108495 A | 6/2013 |
| WO | 2013007912 A1 | 1/2013 |

OTHER PUBLICATIONS

Unofficial English translation of Japan Search Report issued in connection with corresponding JP Application No. 2016-008368 dated Nov. 24, 2016.

Unofficial English translation of Japan Office Action issued in connection with corresponding JP Application No. 2016-008368 dated Nov. 29, 2016.

\* cited by examiner

METHOD OF STARTING A GAS TURBINE ENGINE INCLUDING A COOLING PHASE

BACKGROUND OF THE INVENTION

Turbine engines, and particularly gas or combustion turbine engines, are rotary engines that extract energy from a flow of combusted gases passing through the engine onto a multitude of turbine blades. Gas turbine engines comprise a core formed of a compressor section, combustion section, and turbine section. The compressor section and turbine section comprise compressor blades and turbine blades that are mounted to a common drive shaft, and are collectively referred to as a rotor, which is surrounded by a casing. In some gas turbine engines there are multiple rotors, such as a low pressure rotor and a high pressure rotor, with the drive shafts being coaxial.

Gas turbine engines have been used for land and nautical locomotion and power generation, but are most commonly used for aeronautical applications such as for aircraft, including helicopters. In aircraft, gas turbine engines are primarily used for propulsion of the aircraft, along with power generation. In terrestrial applications, turbine engines are primarily used for power generation.

Gas turbine engines for aircraft are designed to operate at high temperatures, approximately 2000° C., to maximize engine efficiency, therefore cooling of certain engine components may be necessary. Typically, cooling is accomplished by ducting cooler air, approximately 900° C., from the high and/or low pressure compressors to the engine components which require cooling.

When the turbine engine is turned off after operating at such high temperatures, the heat stratifies in the engine core and the top of the rotor will become hotter than the bottom due to rising heat. The stratification can often lead to a 500° C. difference between the top and bottom of the rotor, which leads to asymmetrical thermal expansion between the top and bottom of the rotor. Under such a temperature difference, the top of the rotor thermally expands a greater radial amount causing what is referred to as a bowed-rotor condition. The bowed-rotor condition may occur within 10 minutes of the engine being turned off and may last up to 8 hours.

The asymmetrical thermal expansion moves the center of mass upward and out of alignment with the rotational axis of the shaft, resulting in an out of balance condition when the rotor is turned. This upward movement also reduces the clearance between the tips of the blades and the casing. When the rotor is again rotated, the out of balance caused will cause vibration during rotation. The vibrations will increase rotor deflections, especially when passing through a vibratory mode, such as a rotational natural frequency for the rotor. The vibrations can accelerate normal cracking and fatigue, leading to earlier and more frequent maintenance. They also can accelerate wear and tear on seals and similar structures.

The thermal expansion may be great enough that when the upper part of the rotor is rotated to the lower part of the surrounding engine casing, it may contact the lower portion of the casing, which has not radially expanded as much as the upper portion of the engine casing. The repeated contact or rubbing with the engine casing during rotation of the rotor with a bowed-rotor condition may cause parts to break off and thus may cause foreign object damage to the engine.

Prior solutions to the bowed rotor phenomena are directed to prevention and mitigation once the bow has occurred. The most common current solution is to rotate the engine with the starter for an extended period when it is desired to start the engine until the bow dissipates. This can take several minutes and has several undesirable effects. First, there may be uncomfortably loud cabin noise due to the rotor vibration being carried through the aircraft structure. Second, the aircraft auxiliary power unit life is consumed due to the longer time at high power required to rotate the engine starter. Third, the added starting time causes airport congestion as the aircraft must remain in the taxiway during engine start, blocking other aircraft movements. Fourth, if the engine rotor has a natural frequency in the speed range of the starting sequence, the damage described above can occur. Previous solutions to these problems have proposed to externally rotate the rotor at a low speed, approximately 1 rpm until the bowed rotor phenomena disappears, which is often more than a half an hour, which is an unacceptable downtime in the operation of aircraft, especially commercial airliner.

Typically, upon shutting off the turbine engine, the rotor would be rotated at low speed, approximately 1 rpm, by an external power source, such as a pneumatic drive or electric motor, to prevent the bowed rotor. Such preventative action requires an additional step to the shutdown of the engine, which may be forgotten by a ground crew. Alternatively, the turbine engine would not be shut down, which consumed relatively substantial amounts of fuel. The bowed rotor phenomena can occur as quickly as within 10 minutes of shut down. Thus, even if a ground crew takes action to slowly rotate the engine, they may not act fast enough.

Once the bowed-rotor condition is present, it may naturally last for up to 8 hours, which is an undesirably long time for the aircraft to be out of operation. Thus, given the relatively short time needed for the bowed-rotor condition to arise and the relatively long time for it to naturally subside, it is important to prevent or address the bowed rotor phenomena for normal operation of the aircraft. Otherwise, once the bowed rotor phenomena occurs, the most common current solution is to rotate the engine with the starter for an extended period until the bow dissipates. This can take several minutes and has several undesirable effects. First, there may be uncomfortably loud cabin noise due to the rotor vibration being carried through the aircraft structure. Second, the aircraft auxiliary power unit life is consumed due to the longer time at high power required to rotate the engine starter. Third, the added starting time causes airport congestion as the aircraft must remain in the taxiway during engine start, blocking other aircraft movements. Fourth, if the engine rotor has a natural frequency in the speed range of the starting sequence, the damage described above can occur. Previous solutions to these problems have proposed to externally rotate the rotor at a low speed, approximately 1 rpm, until the bowed rotor phenomena disappears, which is often more than a half an hour, which is an unacceptable downtime in the operation of aircraft, especially commercial airliner.

BRIEF DESCRIPTION OF THE INVENTION

A method of starting a gas turbine engine having a rotor comprising at least a shaft mounted compressor and turbine, with a casing surrounding the rotor. The method comprises an acceleration phase, a bowed-rotor cooling phase, during the acceleration, and a combustion phase. The bowed-rotor cooling phase comprises a time where the rotational speed of the rotor is maintained below a bowed-rotor threshold speed until a non-bowed condition is satisfied, wherein the air forced through the gas turbine engine cools the rotor. The combustion phase occurs after the bowed-rotor cooling phase and upon reaching the combustion speed, wherein fuel is supplied to the gas turbine engine is turned on.

DETAILED DESCRIPTION OF THE INVENTION

Figure 1:
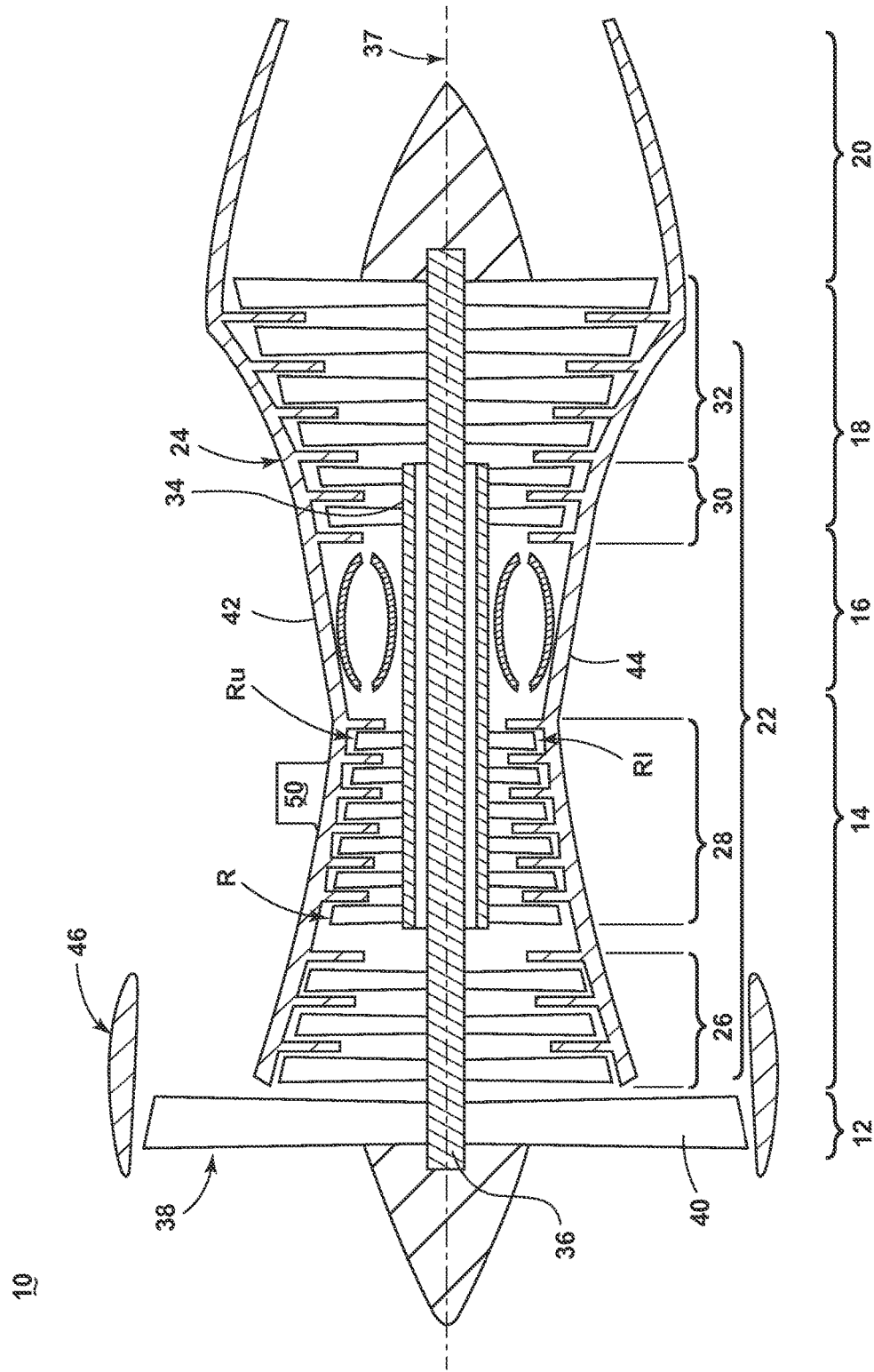
FIG. 1 is a schematic cross-sectional view of a gas turbine engine for an aircraft.

FIG. 1 illustrates a gas turbine engine 10 for an aircraft. The turbine engine 10 comprises, in axial flow order, fan section 12, compressor section 14, combustion section 16, turbine section 18, and exhaust section 20. The compressor section 14, combustion section 16 and turbine section 18 collectively define an engine core 22 that is surrounded by a casing 24. The compressor section comprises a low pressure compressor 26 and a high pressure compressor 28. The turbine section comprises a high pressure turbine 30 and a low pressure turbine 32. A first drive shaft 34 connects the rotating elements, generally blades, of the high pressure compressor 28 and high pressure turbine 30. A second drive shaft extends coaxially through the first drive shaft and connects the rotating element of the low pressure compressor 26 and the low pressure turbine 32. The fan section 12 comprises a fan 38 which further comprises fan blades 40 coupled to the second drive shaft 36. A nacelle 46 may surround a portion of the fan blades 40.

Collectively, the rotating elements of the compressor section 14 and turbine section 18 along with the connecting shafts are referred to as a rotor R. In some turbine engines, the compressor section 14 and turbine section 18 only have a single compressor and turbine connected by one rotating shaft, which would define the engine rotor. In the illustrated example, the turbine engine 10 has two compressors and turbines, low and high pressure, which, along with the first and second drive shafts, define the rotor R. There can be any number of compressor and turbine combinations, which are not limiting on the invention.

A turning motor system 50 is provided on the casing 24 and is operably coupled to the rotor R. A rotational source, external to the turbine engine, may be coupled to the turning motor system 50 to initiate rotation of the rotor. A well-known example of such a rotational source is a turbine air starter (not shown), which is not germane to the invention.

As described in greater detail above, when the turbine engine 10 is shut down after running in normal operation, heat stratifies in the engine core 22 as the heat naturally rises from a lower section 44 of the casing 24 toward a upper section 42 of the casing 24, resulting in the upper section 42 becoming hotter than the lower section 44. Correspondingly, an upper section $R_u$ of the rotor will thermally expand in the radial distance an amount greater than a lower section $R_l$, leading to an asymmetrical radial expansion of the upper and lower sections $R_u$, $R_l$ of the rotor R relative to the rotational axis 37 of the shafts 34, 36. This asymmetrical radial expansion caused by the temperature differential created by the stratification is referred to in the industry as a bowed-rotor. The issue is that the asymmetrical expansion causes the center of mass of the rotor to move radially upward, away from the rotational axis 37 of the shafts, 34, 36, which leads to a rotational imbalance.

In a specific engine example, an out of balance condition caused by the bowed-rotor will cause vibration below 500 RPM and/or when going through critical speeds when the turbine engine 10 is accelerating. Certain turbine engines 10 are more sensitive to a bowed-rotor condition if there is a vibratory mode, such as a natural frequency, near the maximum rotor speed the starting system is capable of producing. For the above example, a peak vibratory mode for the turbine engine 10 may be at 3500 RPM and the maximum starting rotor speed may be 4250 RPM. Since the peak mode is below the maximum rotor speed, high vibrations and rubbing will occur when the turbine engine 10 accelerates through the peak mode at 3500 RPM if a bowed-rotor condition exists.

Figure 2:
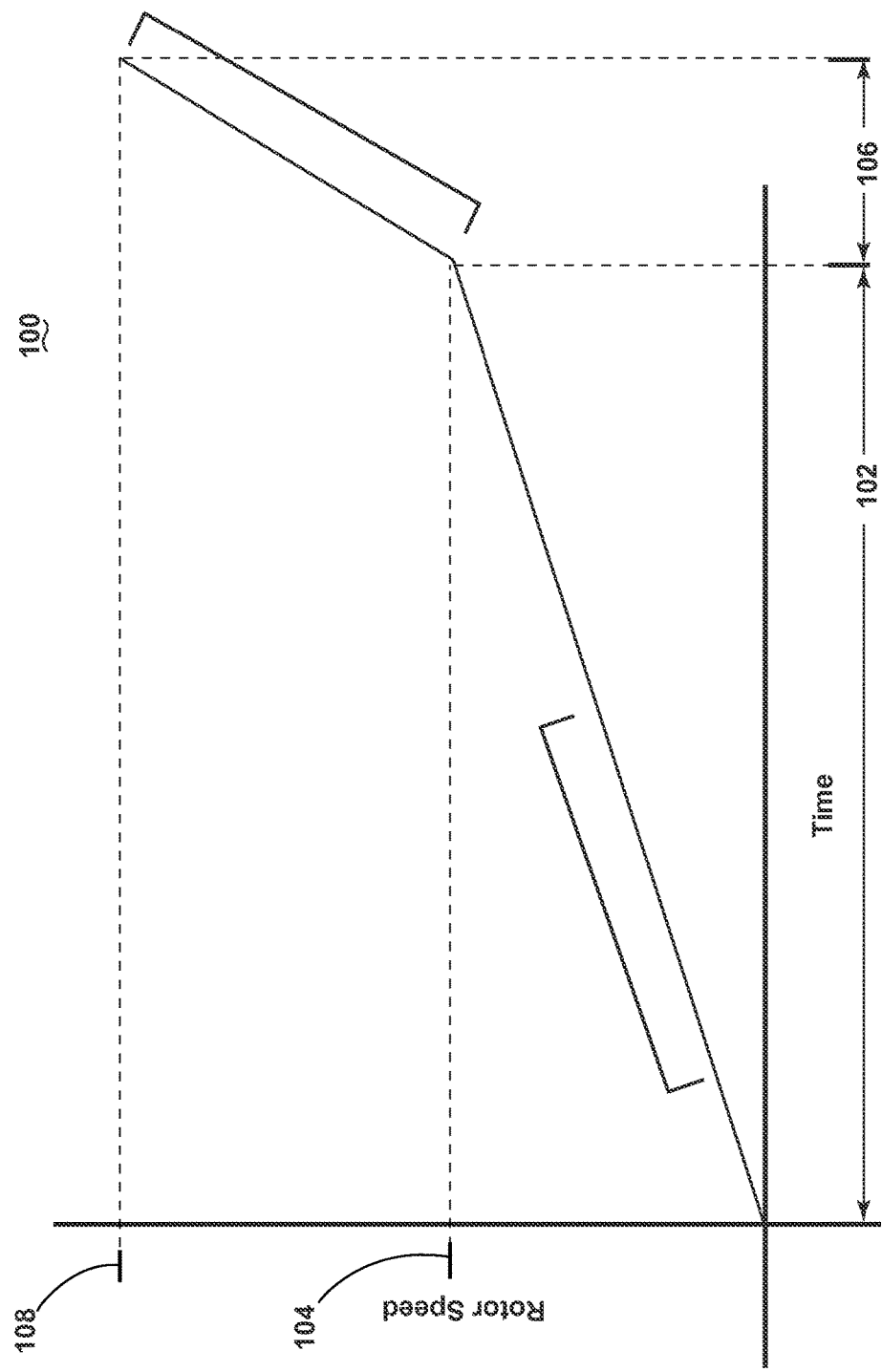
FIG. 2 is a graph of a normal start sequence without the invention.

Under a normal start sequence for the turbine engine 10, a turbine engine 10 with a bowed-rotor condition can experience vibrations associated with the bowed-rotor condition. This is best seen with reference to FIG. 2, where the normal start sequence 100 for a turbine engine 10, which represents the rotor speed during start as a function of time. A typical start sequence 100 begins with a first acceleration phase 102 where the rotational speed of the rotor R is increased by external power until it reaches a combustion speed 104, which is where the engine is producing sufficient compression for combustion. Upon reaching the combustion speed 104, fuel is provided to the turbine engine and the ignition system is turned on to ignite the fuel. After commencing combustion at the end of the first acceleration phase 102, the rotational speed of the rotor R is increased during a second acceleration phase 106 using engine-generated power, instead of external power, to an idle speed 108. The second acceleration phase 106 typically has a greater rate of acceleration because the power generated by the turbine engine is greater than the external power during the first acceleration phase.

Figure 3:
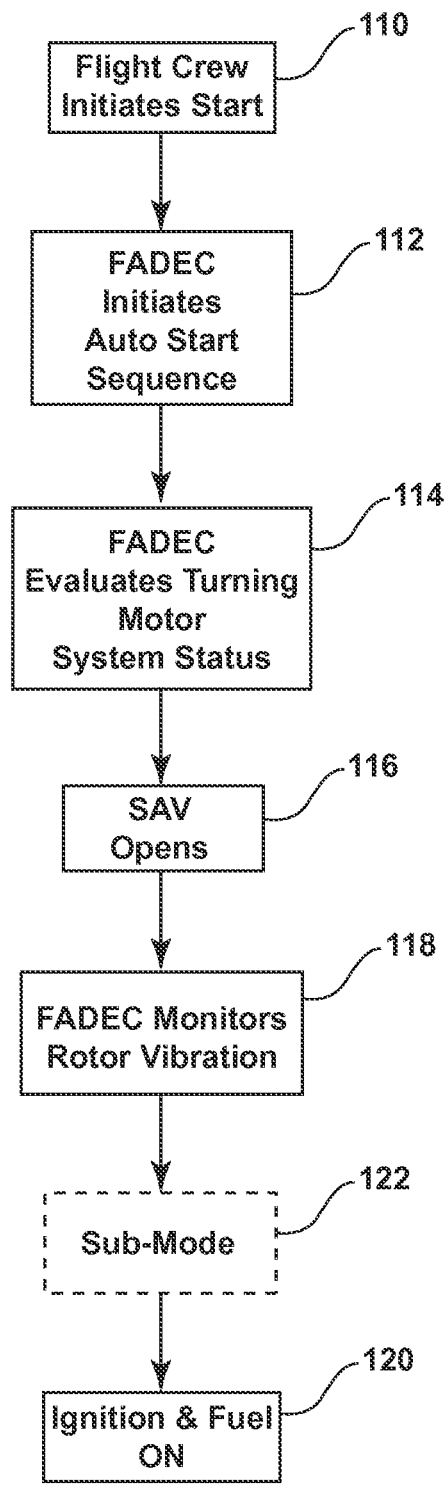
FIG. 3 is a flow chart of a normal start sequence.

Referring to FIG. 3, to practically implement the start sequence 100, at the time of engine start up, the flight crew initiates the start sequence using the Flight Management System of the aircraft at 110, which turns authority over to a Full Authority Digital Engine Control (herein after referred to as "FADEC") that carries out an auto start sequence at 112. The FADEC evaluates the turning motor 50 status at 114, and opens a starter air valve ("SAV") (when using a turbine air starter) at 116 to supply the starting air and begin the first acceleration phase 102. During the first acceleration phase 102, the FADEC monitors the vibration of rotor R for a period of time as the rotor increases speed to the combustion speed 104 at 118. Once the combustion speed 104 occurs and the vibration is sensed to be low enough for acceleration to the idle speed 108, ignition and fuel supply are initiated at 120. At that point, the FADEC will initiate the second acceleration phase 106 and the rotor will accelerate to at idle speed 108. After reaching the idle speed 108, the turbine engine then continues to run at the idle speed 108 in an idle phase. If the monitored vibration is too great, which can be indicative of a bowed-rotor condition, the SAV will be shut and the rotation will be stopped, which is highly undesirable.

The invention eliminates the need to shut down the turbine engine in this instance and takes corrective action when a bowed-rotor condition is present. In general, the invention takes advantage of the air being drawn through the turbine engine during the start sequence to rapidly cool the rotor R and relieve the bowed-rotor condition during start. This is accomplished during the start sequence by adding a sub-mode 122 for a bowed-rotor cooling phase to the start sequence where the rotor is rotated below a predetermined bowed-rotor speed threshold, preventing damage to the rotor, until a non-bowed-rotor condition is satisfied. The non-bowed-rotor condition may be a predetermined time of rotation that is sufficient to ensure air being drawn through the turbine engine provides sufficient cooling for relief of enough of the bowed-rotor condition for safe operation, or it may be engine parameter, such as a temperature of the rotor or an imbalance of the rotor.

Figure 4:
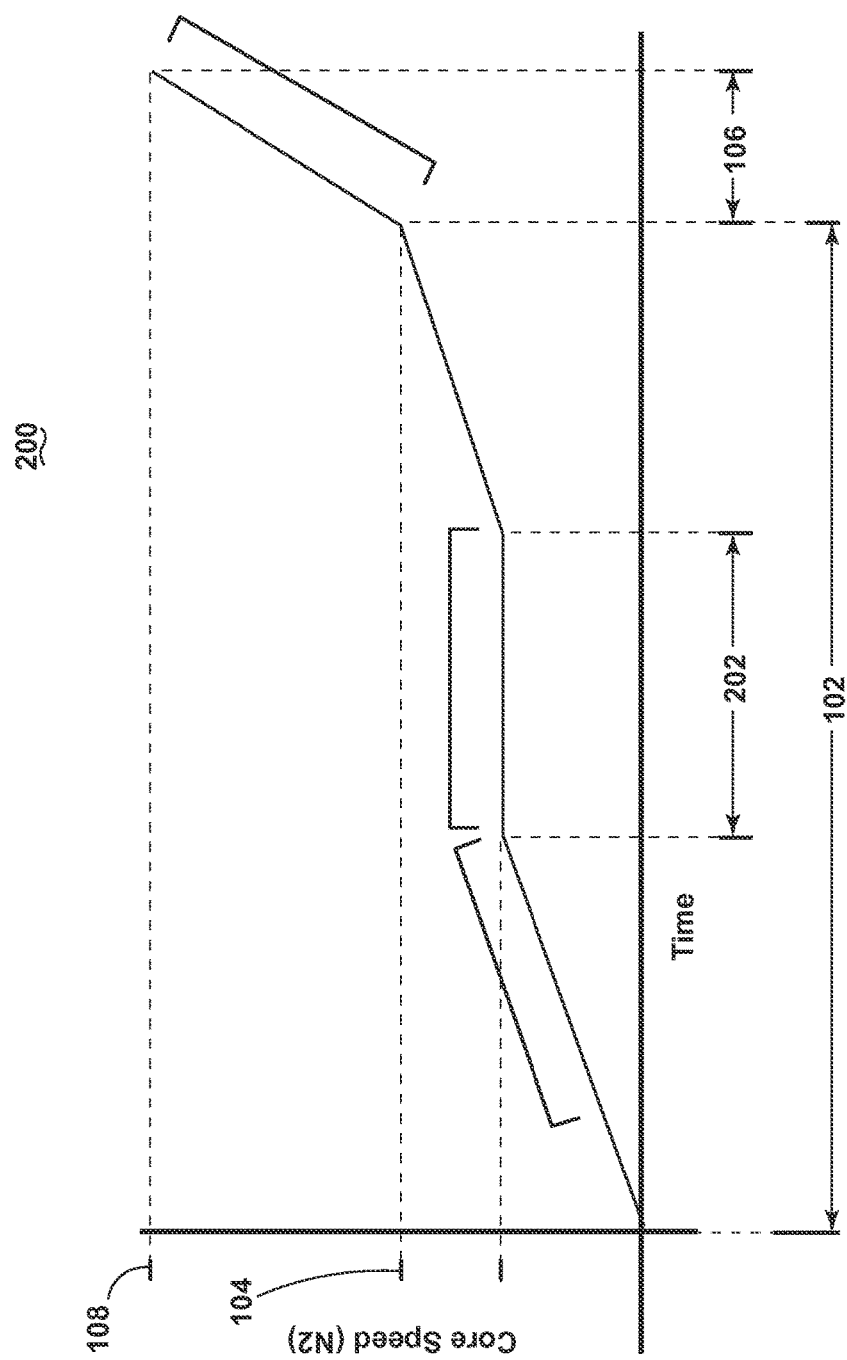
FIG. 4 is a graph of a start sequence with a bowed rotor according to a first embodiment of the invention.

FIG. 4 illustrates one embodiment of the bowed-rotor cooling phase sub mode where air drawn through the turbine engine is used to cool the rotor and relieve the bowed-rotor condition. The start sequence 200 of FIG. 4 carries out the invention by adding a bowed-rotor cooling phase in the form of a dwell phase 202 to the first acceleration phase 102 of the start sequence of FIG. 3. In this sense, the start sequence 200 is similar to the start sequence 100 except for the addition of the dwell phase 202. Thus, the prior description of the start sequence 100 applies to the start sequence 200. For brevity, only the aspects related to the additional dwell phase 202 will be described.

During the first acceleration phase 102, if the FADEC determines an imbalance that is indicative of a bowed-rotor condition, instead of shutting off the turbine engine, the FADEC initiates the bowed rotor cooling phase in the form of the dwell phase 202, which comprises temporarily ceasing the acceleration of the rotor R and rotating the rotor R at a substantially constant speed until the bowed-rotor condition is relieved, such as by satisfying a non-bowed-rotor condition, such as a non-bowed rotor threshold. Upon relief of the bowed-rotor condition, the first acceleration phase 102 is continued, and the start sequence 200 completes in the same manner as the start sequence 100.

Several non-bowed-rotor thresholds may be used to determine the relief of the bowed-rotor condition. One non-bowed-rotor threshold is to operate the dwell phase 202 for a predetermined time, which can be a time that is determined by testing, that is sufficient for the particular rotor R rotating at the dwell speed to sufficiently cool to eliminate the bowed-rotor condition. Another non-bowed-rotor threshold is the FADEC sensing the rotor imbalance during the dwell phase. As the rotor cools, the expansion disparity within the rotor disappears, which reduces the amount of the imbalance sensed by the FADEC. Once the amount of imbalance drops below an acceptable threshold for the given turbine engine, the FADEC will terminate the dwell phase 202 and resume the first acceleration phase 102. As the amount of imbalance is generally related to the magnitude of vibrations at a given speed, the FADEC may use motion sensor inputs that are indicative of the vibrations to determine the degree of imbalance. Another non-bowed rotor threshold is monitoring the temperature of one or more portions of the rotor. When the temperatures are within a predetermined range of each other or below an absolute threshold, the FADEC may determine that the bowed-rotor condition is relieved and resume the first acceleration phase 102. The temperature can be determined by the FADEC receiving temperature sensor inputs for one or more portions of the rotor, casing, and/or casing interior. The previously described non-bowed-rotor thresholds may be used separately or in any combination. Other non-bowed-rotor thresholds may also be used alone or in combination with those described above.

It should be noted that while only one dwell phase 202 is illustrated, it is contemplated that multiple dwell phases 202 may be used. If after the completion of the first dwell phase 202 and the first acceleration phase is being completed, the FADEC determines an imbalance indicative of a bowed-rotor condition, another dwell phase 202 could be entered. As many dwell phases as needed could be added. This would lead to a stair-step-like profile to the first acceleration phase, with the rise of the stair step being part of the first acceleration phase 102, and the run being a dwell phase 202, where the dwell phases 202 would likely, but not necessarily, have sequentially increasing rotational speeds.

While the dwell phase 202 is illustrated as being during the first acceleration phase 102, it should be noted that the dwell phase 202 can be applied to any phase of the start sequence 200, including the second acceleration phase 106. The dwell phase 202 is illustrated as being in the first acceleration phase 102 as that is the phase where the rotor speed is likely to be below the bowed-rotor threshold speed, where it is not detrimental to the turbine engine to rotate the rotor with a bowed-rotor condition. However, depending on the turbine engine, the bowed-rotor threshold speed may occur during the second acceleration phase 106. The bowed-rotor threshold speed is dependent on the vibration modes of the rotor and/or the clearance between the rotor R and the surrounding casing 24. In most cases, the bowed-rotor threshold speed is a speed below that speed at which the rotor R would contact a portion of the casing 24 because of vibrations associated with the current imbalance attributable to the bowed-rotor condition.

It should further be noted that while the bowed rotor cooling phase is illustrated as a dwell phase 202 having a constant speed, this need not be the case. The bowed rotor cooling phase could just use a much slower acceleration rate than the first acceleration phase 102, for example. The goal during the dwell phase 202 is to provide sufficient time for the rotor R to be sufficiently cooled to eliminate the bowed-rotor condition before the rotational speed of the rotor R reaches the bowed-rotor threshold speed for the corresponding imbalance. As the bowed rotor-condition is relieved, the corresponding bowed-rotor threshold speed will necessarily increase because the rotor R continuously shrinks as it is being cooled, resulting in a continuous reduction in the imbalance of the rotor R attributable to the bowed-rotor condition.

The bowed rotor cooling phase could also be a combination of acceleration and deceleration steps, where the acceleration continues until the FADEC determines an unacceptable imbalance and then the rotor is slightly decelerated. After the passage of a predetermined time and/or the satisfying of another non-bowed-condition threshold, rotor R would once again be accelerated until an unacceptable imbalance is encountered. The acceleration/deceleration would continue until the imbalance is relieved.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of starting a gas turbine engine having a rotor comprising at least a shaft mounted compressor and turbine, with a casing surrounding the rotor, the method comprising:

initiating a first acceleration phase where the rotational speed of the rotor is increased toward a combustion speed to force air through the gas turbine engine;
sensing vibrations during the first acceleration phase while the rotational speed of the rotor is equal to or less than 500 rpm;
sensing a first bowed rotor condition during the first acceleration phase;
initiating a first bowed-rotor cooling phase during the first acceleration phase, where the rotational speed of the rotor is maintained below a first bowed-rotor threshold speed until a first non-bowed rotor condition is satisfied, wherein the air forced through the gas turbine engine cools the rotor;
sensing the first non-bowed rotor condition;
thereafter, initiating a second acceleration phase, wherein the rotor speed is increased from at least 500 rpm toward the combustion speed;
sensing a second bowed rotor condition during the second acceleration phase;
initiating a second bowed-rotor cooling phase during the second acceleration phase, where the rotational speed of the rotor is decelerated below a second bowed-rotor threshold speed and above the first bowed-rotor threshold speed until a second non-bowed rotor condition is satisfied, wherein the air forced through the gas turbine engine cools the rotor;
sensing the second non-bowed rotor condition; and
thereafter, initiating a combustion phase, where upon reaching the combustion speed during the combustion phase fuel is supplied to the gas turbine engine and ignition is turned on.

2. The method of claim 1, wherein the rotor is accelerated during the first bowed rotor cooling phase at an acceleration rate that is slower than during the first acceleration phase prior to sensing the first bowed rotor condition.

3. The method of claim 1, wherein the rotor is accelerated during the second bowed rotor cooling phase at an acceleration rate that is slower than during the second acceleration phase prior to sensing the second bowed rotor condition.

4. The method of claim 1, wherein the first acceleration phase and the second acceleration phase comprise externally rotating the rotor.

5. The method of claim 1, wherein the first bowed-rotor threshold speed comprises a non-contact speed below which the rotor does not contact the casing.

6. The method of claim 5, wherein the non-contact speed is less than a natural frequency of the turbine engine.

7. The method of claim 1, wherein the first non-bowed-rotor condition comprises a rotational imbalance of the rotor.

8. The method of claim 1, wherein sensing the first non-bowed rotor condition comprises:
sensing a rotational imbalance of the rotor during the first bowed-rotor cooling phase; and
determining that the rotational imbalance is less than a rotational imbalance threshold to satisfy the first non-bowed-rotor condition.

9. The method of claim 1, wherein sensing the first non-bowed rotor condition comprises:
monitoring a temperature at multiple portions of the rotor; and
determining when the temperatures monitored are within a predetermined range of each other to satisfy the first non-bowed rotor condition.

10. The method of claim 1, wherein the second non-bowed-rotor condition comprises a rotational imbalance of the rotor.

11. The method of claim 1, wherein sensing the second non-bowed rotor condition comprises:
sensing the rotational imbalance of the rotor during the second bowed-rotor cooling phase; and
determining that the rotational imbalance is less than a rotational imbalance threshold to satisfy the second non-bowed-rotor condition.

12. The method of claim 1, wherein sensing the second non-bowed rotor condition comprises:
monitoring a temperature at multiple portions of the rotor; and
determining when the temperatures monitored are within a predetermined range of each other to satisfy the second non-bowed rotor condition.

13. The method of claim 1, wherein maintaining the rotational speed of the rotor below the first bowed-rotor threshold speed comprises maintaining the rotational speed of the rotor at a substantially constant speed.

14. The method of claim 13, wherein the constant speed is less than a natural frequency of the turbine engine.

15. A method of starting a gas turbine engine having a rotor comprising at least a shaft mounted compressor and turbine, with a casing surrounding the rotor, the method comprising:
accelerating the rotor during an acceleration phase, where the rotational speed of the rotor is increased toward a combustion speed to force air through the gas turbine engine;
actively sensing vibrations during a condition monitoring phase during the acceleration phase, wherein vibrations are actively monitored while the rotational speed of the rotor is equal to or less than 500 rpm;
actively sensing vibrations during a bowed-rotor condition monitoring phase in the acceleration phase, where the rotor is monitored for a bowed-rotor condition;
maintaining a first rotational speed of the rotor, during a first bowed-rotor cooling phase during the acceleration phase, below a non-contact speed below which the rotor does not contact the casing upon the presence of the bowed-rotor condition; and
maintaining a second rotational speed of the rotor during a second bowed-rotor cooling phase following the first bowed-rotor cooling phase, whereupon in the presence of the bowed-rotor condition the rotational speed of the rotor continues to be maintained below the non-contact speed below which the rotor does not contact the casing, and wherein the second rotational speed of the rotor is greater than the first rotational speed,
wherein at least a portion of the bowed-rotor condition monitoring phase occurs after initiating the first bowed-rotor cooling phase.

* * * * *